United States Patent [19]

Iwata et al.

[11] Patent Number: 5,431,242
[45] Date of Patent: Jul. 11, 1995

[54] AUTOMOBILE TRACTION CONTROL SYSTEM

[75] Inventors: Toru Iwata; Sota Yasuda, both of Yokohama, Japan

[73] Assignee: Nissan Motor Co., Ltd., Yokohama, Japan

[21] Appl. No.: 253,025

[22] Filed: Jun. 2, 1994

[30] Foreign Application Priority Data

Jun. 30, 1993 [JP] Japan .................. 5-160648

[51] Int. Cl.6 .................................... B60K 28/16
[52] U.S. Cl. .................. 180/197; 364/426.03; 123/417
[58] Field of Search .......... 180/197; 364/426.03, 364/426.01, 424.1; 123/406, 416, 417

[56] References Cited

U.S. PATENT DOCUMENTS

| | | | |
|---|---|---|---|
| 4,850,656 | 7/1989 | Ise et al. ................ | 180/197 X |
| 4,957,194 | 9/1990 | Sawa et al. ............. | 192/3.3 |
| 5,265,693 | 11/1993 | Rees et al. ............. | 180/197 |
| 5,281,008 | 1/1994 | Kawamura et al. ..... | 180/197 X |
| 5,282,137 | 1/1994 | Suzuki et al. .......... | 180/197 X |
| 5,283,742 | 2/1994 | Wazaki et al. ......... | 180/197 X |
| 5,295,552 | 3/1994 | Kageyama et al. ..... | 180/197 |
| 5,369,586 | 11/1994 | Bridgens ................ | 180/197 X |

FOREIGN PATENT DOCUMENTS 1-147127 6/1989 Japan .

*Primary Examiner*—Margaret A. Focarino
*Assistant Examiner*—Kevin Hurley
*Attorney, Agent, or Firm*—Lowe, Price, LeBlanc & Becker

[57] ABSTRACT

An automobile total traction control system comprises a primary traction control system utilizing at least one of a fuel-cut control and an ignition-timing control, a secondary traction control system utilizing a driving-force reduction control different from the fuel-cut control and the ignition-timing control, sensors for detecting a wheel speed of each road wheel to derive a slip rate of each drive wheel and detecting an engine condition such as engine load and engine speed, and a controller for determining an acceleration-slip state of the vehicle based on the derived slip rate. During acceleration-slip, the controller determines the control allocation between the primary and secondary traction control systems based on the detected engine load, such that the control allocation of the primary traction control system to the secondary traction control system is decreased in accordance with an increase in the detected engine load.

8 Claims, 4 Drawing Sheets

AUTOMOBILE TRACTION CONTROL SYSTEM

BACKGROUND OF THE INVENTION

1. Field of the Invention

The present invention relates to a total traction control system which can be optimally applied in use for an automotive vehicle with both a first group of traction control system executing a traction control system based on a fuel-cut control and/or an ignition timing control, and a second group of traction control system executing a traction control based on a differential limiting torque control, a Wheel brake control, a throttle opening control, and/or a gear ratio control in an automatic transmission.

2. Description of the Prior Art

One such conventional automobile traction control system has been disclosed in Japanese Patent First Publication (Tokkai Heisei) No. 1-147127. In this conventional example, a traction control which is also known as "acceleration-slip control" is executed by utilizing a fuel-cut control according to which fuel-supply to a specified engine cylinder is stopped or an ignition-timing control according to which a preset ignition timing is retarded, so as to reduce an engine output power itself and consequently to suppress acceleration-slip owing to excessive traction applied to drive wheels. It is preferable to execute an output engine-power adjustment type traction control based on fuel-cut or ignition timing adjustment, since a high responsiveness of traction control can be obtained according to the fuel-cut control or the ignition-timing control. On some earlier vehicles, a fuel-increment control is made so as to change an air-fuel ratio at each engine cylinder from a stoichiometric air-fuel ratio towards a rich mixture during high engine load to enhance an output power of an internal combustion engine and to improve a driving performance of the engine. Additionally, the fuel-increment control is performed for the purpose of vaporization cooling in the engine cylinders and the catalytic converter in the exhaust system. Assuming that such vaporization cooling is executed simultaneously during traction control executed by utilizing fuel-cut control, unburnt fuel which is exhausted from engine cylinders subjected to vaporization cooling, tends to be re-combusted in the catalytic converter by incoming air flowing through at least one specified engine cylinder subjected to fuel-cut, thereby resulting in backfiring in the catalytic converter, i.e., overheating of the catalytic converter. As is well known, the catalytic converter must be properly heated to enhance catalytic action. Improper overheating would promote degradation of the catalytic converter. To avoid this, the above-noted Japanese Patent First Publication No. 1-147127 teaches the prevention of fuel-increment during traction control utilizing the fuel-cut control or the ignition-timing control. As set forth above, the conventional traction controller can effectively prevent the catalytic converter from being heated excessively, owing to backfiring therein. However, the conventional traction controller suffers from the drawback that the vaporization cooling in the engine cylinders cannot be executed during traction control even on engine high load. Particularly, in the event that the engine is held within a high-load range during sporty driving on high-friction roads such as dry pavements, acceleration-slip tends to occur repeatedly. Under such a condition, a traction control based on fuel-cut is made to suppress the acceleration-slip, while sacrificing an inherent driving performance of the engine, because a proper fuel-increment is prevented in the previously-noted prior-art traction controller. In order to ensure a satisfactory fuel-increment during sporty driving on dry pavements, another traction control different from the fuel-cut control and the ignition-timing control can be provided to suppress acceleration-slip. Since the differential limiting torque control, the wheel brake control, and the gear ratio control are achieved by adjusting a driving torque transmitted through the driving system to the drive wheels, these traction controls can be referred to as a "a transmitted driving torque adjustment type traction control". The four controls, namely the differential limiting torque control, the wheel brake control, the throttle opening control, and the gear ratio control has some advantages and disadvantages hereinafter described in detail.

(1) Throttle opening control:

The driving force applied to the drive wheel can be reduced at a reduction rate of 0% through 100%. The responsiveness of the throttle opening control is low.

(2) Wheel brake control:

The driving force applied to the drive wheel can be reduced at a reduction rate of 0% through 100%. There is a problem of undesired brake-pad wear.

(3) Differential limiting torque control or Gear ratio control:

The driving force applied to the drive wheel cannot be reduced at a satisfactory reduction rate.

On the other hand, the previously-noted output engine power reduction type traction control based on fuel-cut and ignition-timing adjustment exhibits a high responsiveness of the traction control and a high durability of the system. The output engine power reduction type traction control based on fuel-cut and/or ignition-timing adjustment also suffers from the drawback that a reduction rate of driving force applied to the drive wheel is limited within a relatively narrow range, as compared with the widest reduction rate of 0% through 100% obtained according to the throttle opening control and/or the wheel brake control.

SUMMARY OF THE INVENTION

Accordingly, it is an object of the present invention to provide an improved total traction control system applied in use for an automotive vehicle with both a first group of traction control system executing a traction control based on a fuel-cut control and/or an ignition-timing control, and a second group of traction control system executing a traction control based on a differential limiting torque control, a wheel brake control, a throttle opening control, and/or a gear ratio control in an automatic transmission, which system avoids the foregoing disadvantages of the prior art.

It is another object of the invention to provide an improved total traction control system applied in use for an automotive vehicle with both a first group of traction control system and a second group of traction control system, which can perform vaporization cooling in the engine simultaneously during traction control, without degrading the catalytic converter in the exhaust system.

In order to accomplish the aforementioned and other objects of the invention, a total traction control system for an automotive vehicle, comprises a primary traction control system for decreasingly adjusting an engine power of the vehicle by utilizing at least one of a fuel-cut control and an ignition-timing control, a secondary traction control system for decreasingly adjusting a driving force transmitted to left and right drive-wheels, by utilizing a driving-force reduction control different from the fuel-cut control and the ignition-timing control, acceleration-slip state determination means for deriving a slip rate of each drive wheel and for determining that the vehicle is conditioned in an acceleration-slip state by comparing the derived slip rate with a predetermined threshold, to produce an acceleration-slip state indicative signal, engine-load detection means for detecting an engine load, control allocation determination means responsive to the acceleration-slip state indicative signal, for determining a control allocation between the primary and secondary traction control systems on the basis of the detected engine load, in a manner which decreases the control allocation of the primary traction control system to the secondary traction control system in accordance with an increase in the detected engine load, and means for executing a traction control by operating the primary and secondary traction control systems on the basis of the determined control allocation.

According to another aspect of the invention, a total traction control system for an automotive vehicle, comprises a primary traction control system for decreasingly adjusting an engine power of the vehicle by utilizing at least one of a fuel-cut control and an ignition-timing control, a secondary traction control system for decreasingly adjusting a driving force transmitted to left and right drive-wheels, by utilizing a driving-force reduction control different from the fuel-cut control and the ignition-timing control, wheel-speed difference derivation means for deriving a wheel-speed difference on the basis of a wheel speed of each drive wheel and a wheel speed of each of driven wheels, slip-rate derivation means for deriving a slip rate of the drive wheel based on the wheel-speed difference, engine-load detection means for detecting an engine load, acceleration-slip state determination means for determining that the vehicle is conditioned in an acceleration-slip state by comparing the derived slip rate with a predetermined threshold, to produce an acceleration-slip state indicative signal, control allocation determination means responsive to the acceleration-slip state indicative signal, for determining a control allocation between the primary and secondary traction control systems on the basis of the detected engine load, so that the control allocation of the primary traction control system to the secondary traction control system is set to 1:0 in a given low engine-load region to permit only a primary traction control executed by the primary traction control system, to 0:1 in a given high engine-load region to permit only a secondary traction control executed by the secondary traction control system, and to an engine-load dependent ratio in a transient engine-load region defined among the given low and high engine-load regions, the engine-load dependent ratio being defined so that the control allocation of the primary traction control system to the secondary traction control system is decreased in accordance with an increase in the detected engine load, and means for executing a traction control by operating the primary and secondary traction control systems on the basis of the determined control allocation.

The secondary traction control system may comprise at least one of a differential limiting torque controlling means, a wheel brake force controlling means, a throttle opening angle controlling means, and a transmission gear-ratio controlling means. The engine load detection means may determine the engine load on the basis of either one of an engine revolution speed, a negative pressure of intake air introduced into the engine, and a flow rate of the intake air, or on the basis of an engine revolution speed and a reference injection amount of a fuel injector of the engine.

According to a further aspect of the invention, a total traction control system for an automotive vehicle, comprises a primary traction control system for decreasingly adjusting an engine power of the vehicle by utilizing at least one of a fuel-cut control and an ignition-timing control, a secondary traction control system for decreasingly adjusting a driving force transmitted to left and right drive-wheels, by utilizing a driving-force reduction control different from the fuel-cut control and the ignition-timing control, wheel-speed difference derivation means for deriving a wheel-speed difference on the basis of a mean wheel speed of the left and right drive wheels and a mean wheel speed of left and right driven wheels, slip-rate derivation means for deriving a slip rate of the drive wheel based on the wheel-speed difference, engine-load detection means for detecting an engine load, acceleration-slip state determination means for determining that the vehicle is conditioned in an acceleration-slip state by comparing the derived slip rate with a predetermined threshold, to produce an acceleration-slip state indicative signal, control allocation determination means responsive to the acceleration-slip state indicative signal, for determining a control allocation between the primary and secondary traction control systems on the basis of the detected engine load, so that the control allocation of the primary traction control system to the secondary traction control system is set to 1:0 in a given low engine-load region to permit only a primary traction control executed by the primary traction control system, to 0:1 in a given high engine-load region to permit only a secondary traction control executed by the secondary traction control system, and to a time dependent ratio in a transient engine-load region defined among the given low and high engine-load regions, the time dependent ratio being defined so that the control allocation of the primary traction control system to the secondary traction control system is decreased in accordance with an elapsed time from a particular time point when shifting from the low engine-load region to the transient engine-load region, and means for executing a traction control by operating the primary and secondary traction control systems on the basis of the determined control allocation. The time dependent ratio may preferably be held at 1:0 for a predetermined retardation time from the particular time point, to maintain only the primary traction control.

According to a still further aspect of the invention, a total traction control system for an automotive vehicle, comprises a primary traction control system for decreasingly adjusting an engine power of the vehicle by utilizing a fuel-cut control and an ignition-timing control, a secondary traction control system for decreasingly adjusting a driving force transmitted to left and right drive-wheels, by utilizing a driving-force reduction control different from the fuel-cut control and the ignition-timing control, acceleration-slip state determination means for deriving a slip rate of each drive wheel and for determining that the vehicle is conditioned in an acceleration-slip state by comparing the derived slip rate with a predetermined threshold, to produce an acceleration-slip state indicative signal, engine-load detection means for detecting an engine load, control allocation determination means responsive to the acceleration-slip state indicative signal, for determining a control allocation between the primary and secondary traction control systems on the basis of the detected engine load, in a manner which decreases the control allocation of the primary traction control system to the secondary traction control system in accordance with an increase in the detected engine load, means for executing a traction control by operating the primary and secondary traction control systems on the basis of the determined control allocation, and vaporization cooling means for executing a fuel-increment control for vaporization cooling in engine cylinders and a catalytic converter arranged in an exhaust system; the vaporization cooling means responsive to a vaporization cooling requirement to execute the fuel-increment control to the engine cylinders except at least one specified engine cylinder subjected to the fuel-cut control which is executed by the primary traction control system in accordance with a driving-torque reduction rate based on the control allocation

DESCRIPTION OF THE PREFERRED EMBODIMENTS

Figure 1:
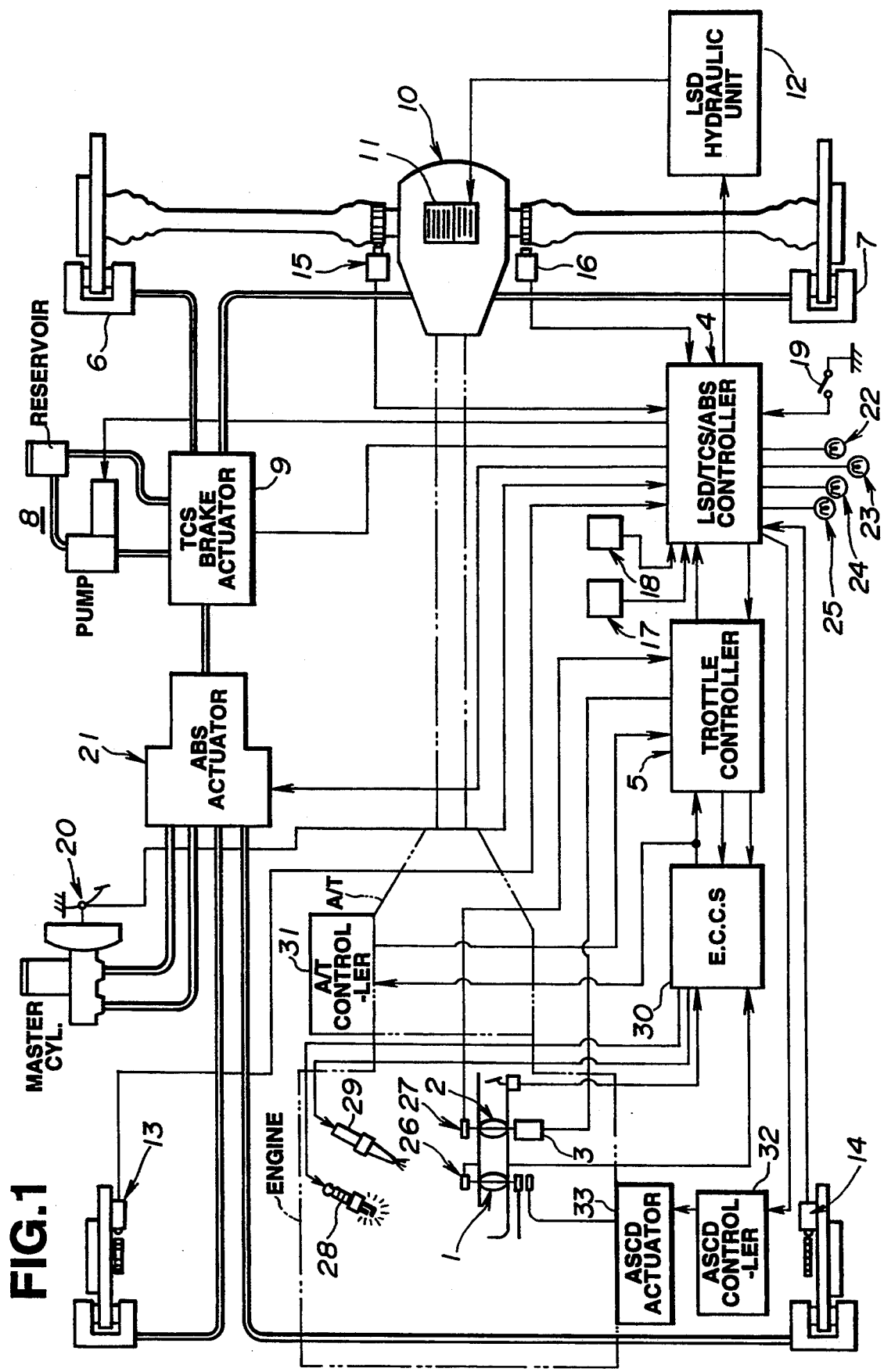
FIG. 1 is a system diagram illustrating an automobile total control system employing a traction control system according to the invention.

Referring now to the drawings, particularly to FIG. 1, the total traction control system of the invention is exemplified in case of a rear-wheel drive vehicle employing a primary traction control system executing a traction control based on a fuel-cut control also called as a "TCS fuel control" and an ignition-timing control also called as a "TCS ignition-timing control" for an engine-power adjustment, and a secondary traction control system executing a traction control based on a throttle opening control also called as a "TCS throttle control" and a brake pressure control also called as a "TCS brake control" for a slip-rate adjustment of each rear drive-wheel towards within a predetermined permissible slip rate, and a differential limiting torque control also called as a "TCS differential limiting control" for a differential limiting torque adjustment to the right and left rear drive-wheels.

Referring now to FIG. 1, the primary traction control, namely the TCS ignition-timing control and the TCS fuel control are performed by generating a drive signal from an engine electronic centralized control system 30 abbreviated as an "E.C.C.S" on the basis of a control command produced by a LSD/TCS/ABS controller 4 which contributes commonly to a differential limiting torque adjustment of a multiple-disc clutch type electronically controlled differential such as a limited slip differential usually abbreviated as a "LSD", to a traction control system usually abbreviated as a "TCS", and to an anti-skid control system usually abbreviated as an "ABS". The engine electronic centralized control system 30 receives information such as engine load and engine revolution speed to adjust an injection amount of an fuel injector 29 depending on the driving condition of the vehicle. During high engine load, the engine electronic centralized control system 30 performs fuel-increment control, for the purpose of vaporization cooling in the engine cylinders and the catalytic converter in the exhaust system. In order to reduce power produced by the engine, the TCS ignition-timing control is achieved by retarding the ignition timing of a spark plug 28 in each engine cylinder, and the TCS fuel control is achieved by executing a fuel-cut operation to the fuel injector 29 associated with at least one specified engine cylinder.

On the other hand, the TCS throttle control included in the secondary traction control is achieved by applying a driving current generated from the throttle controller 5 to a throttle motor 3 on the basis of a control command produced by the LSD/TCS/ABS controller 4. The throttle motor 3 is provided to adjust the opening angle of a second throttle valve 2 which is arranged in an air intake pipe (not numbered) in series to a first throttle 1 mechanically linked to an accelerator pedal. The TCS brake control is achieved by applying a controlled brake-fluid pressure created by a TCS brake actuator 9 to the drive-wheel side wheel brake cylinders 6 and 7. The magnitude of controlled brake-fluid pressure can be varied on the basis of a control command produced by the LSD/TCS/ABS controller 4. The TCS brake actuator 9 generally consists of an electromagnetic solenoid type spool valve, while the control command is equivalent to an exciting current applied to the solenoid of the TCS brake actuator 9. In a conventional manner, the TCS brake actuator operates to increase the flow rate of high-pressure brake fluid passing therethrough and fed from an external brake-fluid pressure source 8 such as an electric pump, and increases the wheel-cylinder pressure of the respective cylinders 6 and 7 during the TCS brake control, thereby preventing wheel spin.

The TCS differential limiting control is achieved by adjusting an engaging force of a differential limiting clutch 11 such as a multiple-disc clutch incorporated in a limited slip differential 10. As is generally known, the differential limiting clutch 11 is hydraulically operated by a clutch control pressure generated by a LSD hydraulic unit 12. The magnitude of the clutch control pressure is varied in response to a control command generated from the LSD/TCS/ABS controller 4. For example, in the event that either one of the rear drive-wheels is conditioned in the acceleration-slip state, a differential limiting torque, i.e., an engaging force of the clutch 11 is increased so that a portion of driving torque fed to the acceleration-slipping less-traction wheel is transmitted to the non-slipping greater-traction wheel. In this manner, acceleration-slip is effectively suppressed to provide good traction.

The LSD/TCS/ABS controller 4 receives four wheel-speed signals respectively indicative of a front-right wheel speed $V_{ANR}$ detected by a front-right wheel speed sensor 13, a front-left wheel speed $V_{ANL}$ detected by a front-left wheel speed sensor 14, a rear-right wheel speed $V_{NAR}$ detected by a rear-right wheel speed sensor 15, a rear-left wheel speed $V_{NAL}$ detected by a rear-left wheel speed sensor 16, and two acceleration signals respectively indicative of a lateral acceleration $Y_G$ detected by a lateral acceleration sensor 17 and a longitudinal acceleration $X_G$ detected by a longitudinal acceleration sensor 18, and two switch signals respectively produced by a TCS ON/OFF switch 19 and a brake lamp switch 20, and a first throttle opening angle indicative signal $\theta_1$ fed from a-first throttle opening sensor 26 via a throttle controller 5, and a second throttle opening angle indicative signal $\theta_2$ fed from a second throttle opening sensor 27 via the throttle controller 5. The LSD/TCS/ABS controller 4 outputs an ABS control command to an ABS actuator 21 to execute an anti-skid brake control in the presence of an anti-skid brake control requirement. The LSD/TCS/ABS controller 4 outputs a lighting command to a TCS indicator 22 during operation of a traction control system (TCS) to visually indicate whether or not the traction control is executed. Similarly, the controller 4 outputs a lighting command to a TCS warning lamp 23 in the case of failure of the traction control system, a lighting command to an ABS warning lamp 24 in case of failure of the anti-skid brake control system (ABS), and a lighting command to a LSD warning lamp 25 in case of failure of the limited slip differential (LSD). The throttle controller 5 receives the first and second throttle opening angle indicative signals $\theta_1$ and $\theta_2$, respectively generated by the first and second throttle opening sensors 26 and 27. The throttle controller 5 mainly includes a throttle motor drive circuit which drives the throttle motor 3 in response to the drive current output from the controller 4, depending on the driving conditions of the vehicle.

As seen in FIG. 1, the total traction control system consisting of the primary and secondary traction control systems is usually associated with various peripheral control systems, in order to perform a more precise traction control. Included as the peripheral control systems are the engine electronic centralized control system (E.C.C.S) 30, an automatic transmission control system consisting of an automatic transmission controller (A/T controller) 31, and an auto-cruise control system consisting of an auto speed control device controller (ASCD controller) 32 and an auto speed control actuator (ASCD actuator) 33. The operation of the total traction control system according to the invention will be hereinafter described in detail in accordance with the flow chart shown in FIG. 2.

In step 40, the LSD/TCS/ABS controller 4 derives the respective wheel speeds $V_{ANR}$, $V_{ANL}$, $V_{NAR}$, and $V_{NAL}$ detected by the wheel speed sensors 13, 14, 15 and 16.

In step 41, the controller 4 derives a slip rate S by calculating the difference between a mean value of the two rear drive-wheel speeds $V_{NAR}$ and $V_{NAL}$, and a mean value of the two front driven-wheel speeds $V_{ANR}$ and $V_{ANL}$.

In step 42, the controller 4 estimates an engine load on the basis of an engine revolution speed $N_E$, an injection amount of the fuel injector 29, a negative pressure of intake air flowing through the air intake pipe, an engine torque output by the engine.

In step 43, a test is made to determine whether or not the traction control is executed, i.e., acceleration-slip occurs. The traction control is put into operation in case that the slip rate calculated in step 41 becomes greater than a predetermined slip-rate threshold. In actual, the controller 4 determines on the basis of comparison results between the calculated slip rate and its predetermined threshold, as to whether the TCS is operative or inoperative. In other words, the controller 4 determines that the road wheel experiences acceleration-slip, when the slip rate S exceeds the predetermined threshold. On the basis of the wheel-speed difference between the drive-wheel and the driven wheel, the acceleration-slip state can be detected. When the answer to step 43 is negative (NO), one cycle of the control routine for the traction control is terminated. This control routine is executed as time-triggered interrupt routines to be triggered every predetermined time intervals. When the answer to step 43 is affirmative (YES), step 44 proceeds in which a driving-torque reduction rate correction coefficient K is determined and derived depending on the estimated engine load, as detailed later.

In step 45, the controller 4 derives a first driving-torque reduction rate $T_D(S)$ for the primary traction control system on the basis of the slip rate S calculated in step 41, and further derives a first controlled variable $\Delta T_D$ to be supplied to the primary traction control system, based on the first driving-torque reduction rate $T_D(S)$ and the driving-torque reduction rate correction coefficient K calculated in step 44, in accordance with the following equation.

$$\Delta T_D = T_D(S) \times K$$

where, the first driving-torque reduction rate $T_D(S)$ for the primary traction control system corresponds essentially to the number of engine cylinders brought into fuel-cut state in case of the TCS fuel control, and essentially to a retardation degree of the ignition timing in case of the TCS ignition-timing control.

In step 46, the controller 4 derives a second driving-torque reduction rate F(S) for the secondary traction control system on the basis of the slip rate S obtained through step 41, and further derives a second controlled variable $F_K$ to be supplied to the secondary traction control system, based on the second driving-torque reduction rate F(S) and the driving-torque reduction rate correction coefficient K in accordance with the following equation.

$$F_K = F(S) \times (1 - K)$$

where the second driving-torque reduction rate F(S) for the secondary traction control system corresponds essentially to a pressure increase time of the wheel-cylinder pressure of each drive-wheel in case of the TCS brake control, and essentially to a differential limiting torque in case of the TCS differential limiting control, and essentially to a throttle closing angle in case of the TCS throttle control.

In step 47, the primary traction control system operates to produce the first controlled variable $\Delta T_D$ obtained in step 45, while the secondary traction control system operates to produce the second controlled variable $F_K$ obtained in step 46.

It will be noted that an actual driving-torque reduction rate correction coefficient for the primary traction control system is denoted as K, and an actual driving-torque reduction correction coefficient for the secondary traction control system is denoted as (1−K). The ratio K:(1−K) of the actual driving-torque reduction rate correction coefficient K for the primary traction control system to the actual driving-torque reduction rate correction coefficient (1−K) for the secondary traction control system, corresponds essentially to the control allocation between the primary traction control and the secondary traction control during traction control. The previously-noted driving-torque reduction rate correction coefficient K is determined as follows.

Figure 3:
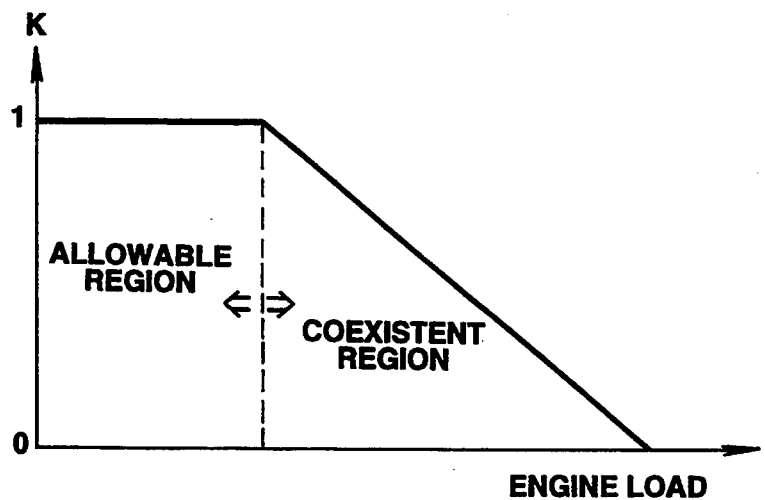
FIG. 3 is a graph illustrating an engine-load versus driving-torque reduction rate correction coefficient K characteristic.
Figure 5:
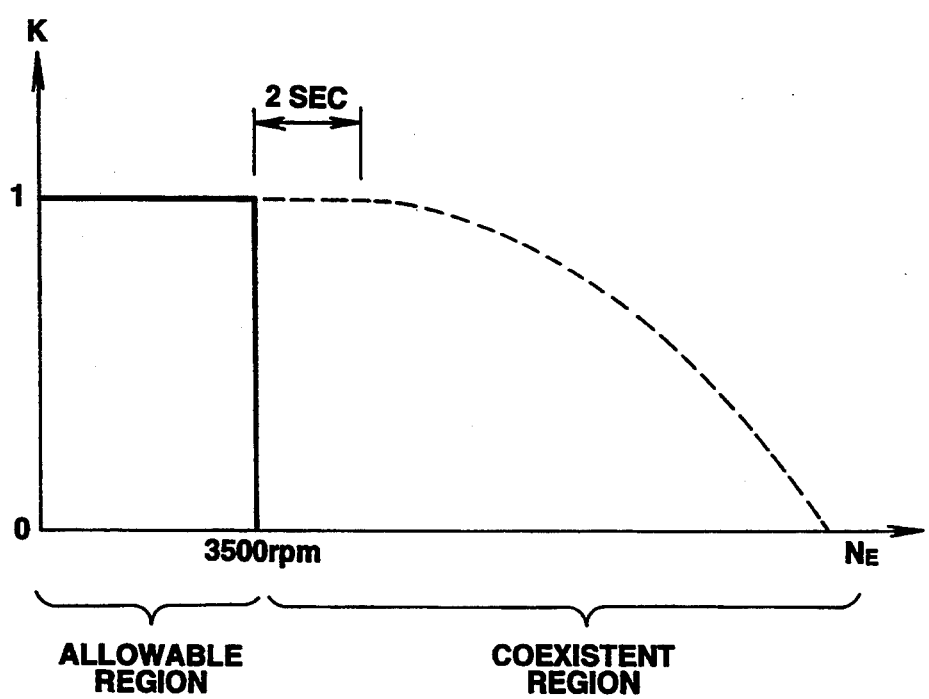
FIG. 5 is a graph illustrating an elapsed time dependent control allocation between the primary and secondary traction controls in the coexistent region.

FIG. 3 shows a first example for determination of the driving-torque reduction rate correction coefficient K. In case of this example shown in FIG. 3, the correction coefficient K is varied depending on the engine load estimated in step 42. As appreciated from FIG. 3, the correction coefficient K is set to "1" in the event that the estimated engine load is within a low engine-load range. For instance, as seen in FIG. 5, the controller 4 determines that the engine is put on a low engine load state, when the engine revolution speed $N_E$ is equal to or less than a given engine load threshold, i.e., a given engine speed threshold such as 3500 rpm. In this case, the second controlled variable $F_K$ fed to the secondary traction control system is zero, because the actual driving-torque reduction rate correction coefficient (1−K) for the secondary traction control system is equivalent to zero owing to K=1. Thus, only the primary traction control system is put into operation, in order to produce the first controlled variable $\Delta T_D$. Accordingly, the driving torque to the slipping less-traction drive wheel is effectively reduced on the basis of only the first controlled variable $\Delta T_D$. Such a low engine-load region wherein K is set to "1", will be hereinafter referred to as a "primary traction control allowable region". On the other hand, when the engine load is greater than the given engine load threshold, the correction coefficient K is designed to gradually decrease in accordance with an increase rate of the estimated engine load and to finally reach to zero at a specified high engine load depending on various different kinds of automotive vehicles. As seen in FIG. 3, the correction coefficient K is set to zero when the estimated engine load is above the specified high engine load. In this case, the first controlled variable $\Delta T_D$ fed to the primary traction control system is zero, because the actual driving-torque reduction rate correction coefficient K for the primary traction control system is equivalent to zero. Thus, only the secondary traction control system is put into operation, in order to produce the second controlled variable $F_K$, with the result that the driving torque to the slipping less-traction drive wheel is effectively reduced on the basis of only the second controlled variable $F_K$. Therefore, such a high engine-load region above the specified high engine load will be hereinafter referred to as a "primary traction control inhibiting region". On the other hand, the correction coefficient K is variably adjusted between a value greater than 0 and a value less than 1 in a transient region wherein the estimated engine load is conditioned between the given engine load threshold and the specified high engine load. In the transient region via which the engine load state is changed from one of low and high engine load states to the other, the first and second controlled variables $\Delta T_D$ and $F_K$ are not zero, because the correction coefficient K is less than 1 and greater than zero, i.e., 0<K<1, as appreciated from the above-indicated two equations. Thus, the primary and secondary traction controls are both executed at the control allocation K:(1−K) based on the correction coefficient K (not zero and not "1"). For the reasons indicated above, such a transient region of engine load will be hereinafter referred to as a "coexistent region of primary and secondary traction controls". As set forth above, the primary traction control allowable region, the primary traction control inhibiting region, and the coexistent region of the primary and secondary traction controls are dependent on the driving-torque reduction rate correction coefficient K so that the traction control is performed within the primary traction control allowable region in case of K=1, within the primary traction control inhibiting region in case of K=0, and within the coexistent region of the primary and secondary traction controls in case of 0<K<1.

Figure 4:
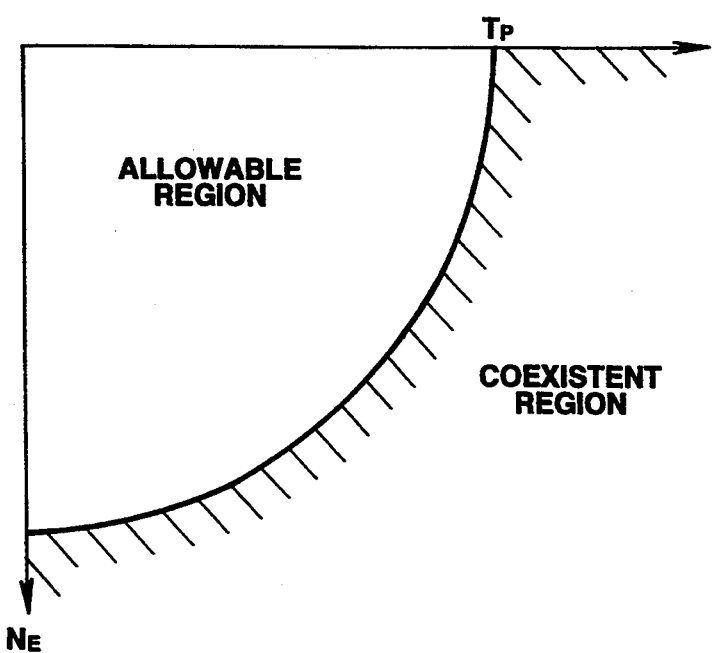
FIG. 4 is a graph illustrating the relation between an allowable region of only the primary traction control and a coexistent region of both the primary and secondary traction controls.

In the previously-noted first example of determination of the correction coefficient K, although K is determined by the engine load estimated on the basis of the engine revolution speed $N_E$, the correction coefficient K may be determined on the basis of a matrix or a data map of a reference fuel injection amount $T_P$ and an engine revolution speed $N_E$, as shown in FIG. 4, so that the primary traction control allowable region (K=1) is selected in case of $N_E^2+T_P^2 \leq$ a given threshold, and that the coexistent region (K<1) is selected in case of $N_E^2+T_P^2>$ the given threshold. The determination of the correction coefficient K based on the matrix of the reference fuel injection amount $T_P$ and the engine revolution speed $N_E$ will be referred to as a second example of determination of K. Alternatively, a negative pressure of intake air or a flow rate of intake air may be replaced with the engine revolution speed $N_E$ to determine whether the traction control should be operated within the primary traction control allowable region or within the coexistent region of the primary and secondary traction controls. The determination of the correction coefficient K based on the negative pressure of intake air or the flow rate of intake air will be referred to as a third example of determination of K.

Furthermore, the control allocation K: (1−K) between the primary and secondary traction controls may be determined on the basis of an elapsed time t from a particular time point when the traction control has been just shifted to the coexistent region (the transient region of engine load). For example, the correction coefficient K is set to "1" in case that the elapsed time t is equal to or less than 2 sec, while the correction coefficient K is set to a positive value defined by −(1/5)(t−7) in case that the elapsed time t exceeds 2 sec. In the former case, i.e., t≦2 sec, the control allocation K: (1−K) between the primary and secondary traction controls becomes 1:0, with the result that only the primary traction control is performed. In the latter case, i.e., t>2, the control allocation is set to a ratio of −(1/5)(t−7): 1+(1/5)(t−7). For example, in the event that the elapsed time t is 4 sec, the control allocation K: (1−K) between the primary and secondary traction controls corresponds to 0.6:0.4. Therefore, assuming that the engine load is estimated on the basis of the engine revolution speed $N_E$, the correction coefficient K can be designed to moderately decrease in accordance with the elapsed time t, as illustrated in the phantom line of FIG. 5. In the embodiment, a predetermined retardation time, such as 2 sec is provided to maintain only the primary traction control for the retardation time from a particular time point when shifting from the low engine-load region to the transient engine-load region, whereby a rapid change in the control allocation is prevented. The elapsed time dependent control allocation may be applied for the previously-noted second and third examples of determination of K, in the same manner as the first example explained above.

During driving of the vehicle, the total traction control system according to the invention acts as follows.

Figure 2:
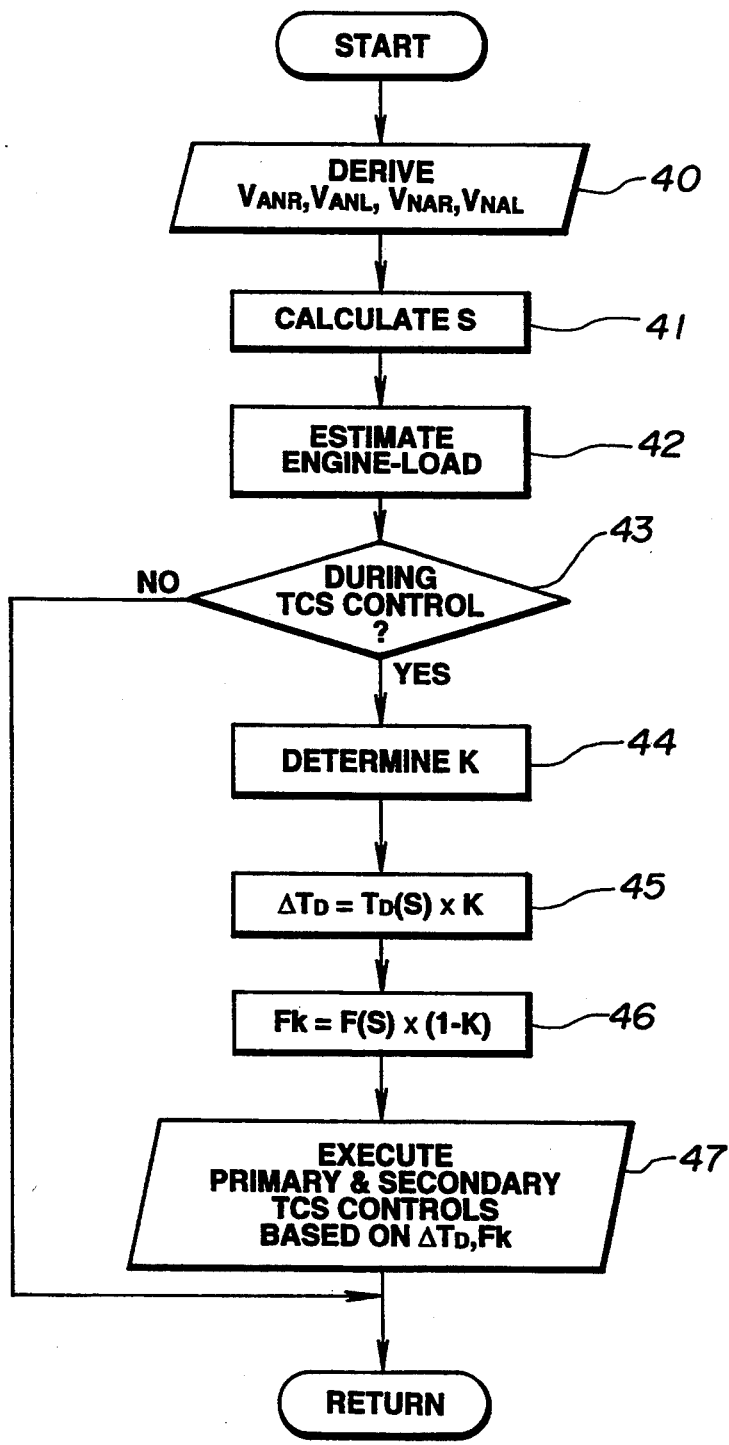
FIG. 2 is a flow chart illustrating a traction control flow executed in the traction control system of the invention.

Assuming that the traction control is executed owing to occurrence of acceleration-slip during driving of the vehicle on low engine load, the correction coefficient K is set to "1" in step 44 of the flow chart illustrated in FIG. 2, and thus the first controlled variable $\Delta T_D$ becomes equal to the first driving-torque reduction rate $T_D(S)$, and the second controlled variable $F_K$ becomes zero. As a result, the control allocation between the primary and secondary traction controls is set to 1:0. In this case, only the primary traction control is exclusively executed in response to the control allocation of 100%, while the secondary traction control is not executed at all in response to the control allocation of 0%. During low engine load, only the primary traction control is executed by the primary traction control system by way of the fuel-cut control and the ignition-timing control, in order to produce the first driving-torque reduction rate $T_D(S)$ depending on the calculated slip rate S. The choice of only the primary traction control consisting of the fuel-cut control and the ignition-timing control is very advantageous in view of a high responsiveness of the traction control and a high durability of the system, because there is no problem about degradation of the catalytic converter and there is no necessity of vaporization cooling in the engine cylinders and the catalytic converter, in the low engine load region.

In the event that the engine load condition is gradually shifted from the above-mentioned low engine load region towards high engine load during the traction control, that is, within the transient region between low and high engine loads, a value of the correction coefficient K determined in step 44 of FIG. 2 is variably adjusted to be gradually decreased in accordance with an increase in the estimated engine load. Thus, the control allocation of the primary traction control to the secondary traction control is gradually decreased in accordance with the increase in the estimated engine load, in a manner that the primary traction control allocation is shifted from 100% towards 0%, while the secondary traction control allocation is shifted from 0% towards 100%. In more detail, the primary traction control is executed with the control allocation of $K \times 100\%$, while the secondary traction control is executed with the control allocation of $(1-K) \times 100\%$. That is, the primary and secondary traction controls are simultaneously executed according to the determined control allocation K: (1−K), in the transient region of engine load. Therefore, the traction control system of the invention can effectively prevent degradation of the catalytic converter and execute fuel-increment control required for vaporization cooling in the engine and the catalytic converter, without sacrificing the responsiveness of the traction control and the durability of the system, in the transient region of engine load. In other words, in the coexistent region, properly harmonized with each other are advantages obtained by the primary traction control, namely a high responsiveness of the traction control and a high durability of the system, and advantages obtained by the secondary traction control, namely prevention of degradation of the catalytic converter and effective vaporization cooling in the engine and the catalytic converter.

Subsequently to the above, in the event that the estimated engine load exceeds a specified high engine load of the vehicle, i.e., when the engine load condition is shifted into the high engine load region, the correction coefficient K is set to "0" through step 44 of FIG. 2, and thus the second controlled variable $F_K$ becomes equal to the second driving-torque reduction rate F(S), and the first controlled variable $\Delta T_D$ becomes zero. Thus, the control allocation between the primary and secondary traction controls is set to 0:1. As a result, only the secondary traction control is exclusively executed in response to the control allocation of 100%, while the primary traction control is not executed in response to the control allocation of 0%. During high engine load, the primary traction control is inhibited, while only the secondary traction control is solely executed by the secondary traction control system utilizing the other driving-torque reduction controls different from the fuel-cut control and the ignition-timing control, for the purpose of production of the second driving-torque reduction rate F(S) depending on the calculated slip rate S. Owing to inhibition of the primary traction control in the primary traction control inhibiting region (in the high engine load region), the traction system of the invention can reliably prevent degradation of the catalytic converter and timely execute fuel-increment control required for vaporization cooling in the engine and the catalytic converter, while satisfactorily producing the inherent driving performance of the engine. According to the traction control of the invention, degradation of the catalytic converter can be prevented and fuel-increment control for vaporization cooling can be timely executed, even when the traction control is repeatedly executed during sporty driving of the vehicle on high-friction roads such as dry pavements.

As will be appreciated from the above, in the total traction control system consisting of both the primary traction control system executing the fuel-cut control and the ignition-timing control and the secondary traction control system executing the other driving-torque reduction controls different from the fuel-cut control and the ignition-timing control, the primary and secondary traction control systems can be operated to suppress acceleration-slip in accordance with the control allocation based on engine load, so that the control allocation of primary traction control to secondary traction control is variably adjusted to be decreased in accordance with an increase in the engine load in the presence of traction control requirement. Therefore, the total traction control system of the invention can optimally compensate the drive-wheel slipping condition towards a good traction state, while preventing the catalytic converter from undesirably degrading and providing an effective fuel-increment control for vaporization cooling in the engine cylinders and in the catalytic converter during high engine load.

Although the primary traction control system is constructed by a control section which executes both the fuel-cut control and the ignition-timing control in the embodiment, the primary traction control system may be constructed by a control section which executes either one of the fuel-cut control and the ignition-timing control.

Furthermore, although the secondary traction control system is constructed by a control section which executes all of the differential limiting torque control, the brake pressure control of each drive-wheel, and the throttle opening control, the secondary traction control system may be constructed by a control section which executes a gear ratio control in an automatic transmission in addition to the three driving-torque reduction controls. Alternatively, the secondary traction control system may be constructed by a control section which executes the above-noted four driving-torque reduction controls, either alone or in any reasonable combination.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A total traction control system for an automotive vehicle, comprising:
   a primary traction control system for decreasingly adjusting an engine power of the vehicle by utilizing at least one of a fuel-cut control and an ignition-timing control;
   a secondary traction control system for decreasingly adjusting a driving force transmitted to left and right drive-wheels, by utilizing a driving-force reduction control different from said fuel-cut control and said ignition-timing control;
   acceleration-slip state determination means for deriving a slip rate of each drive wheel and for determining that the vehicle is conditioned in an acceleration-slip state by comparing the derived slip rate with a predetermined threshold, to produce an acceleration-slip state indicative signal;
   engine-load detection means for detecting an engine load;
   control allocation determination means responsive to said acceleration-slip state indicative signal, for determining a control allocation between said primary and secondary traction control systems on the basis of said detected engine load, in a manner which decreases the control allocation of said primary traction control system to said secondary traction control system in accordance with an increase in the detected engine load; and
   means for executing a traction control by operating said primary and secondary traction control systems on the basis of said determined control allocation.

2. The total traction control system as set forth in claim 1, wherein said secondary traction control system comprises at least one of a differential limiting torque controlling means, a wheel brake force controlling means, a throttle opening angle controlling means, and a transmission gear-ratio controlling means.

3. A total traction control system for an automotive vehicle, comprising:
   a primary traction control system for decreasingly adjusting an engine power of the vehicle by utilizing at least one of a fuel-cut control and an ignition-timing control;
   a secondary traction control system for decreasingly adjusting a driving force transmitted to left and right drive-wheels, by utilizing a driving-force reduction control different from said fuel-cut control and said ignition-timing control;
   wheel-speed difference derivation means for deriving a wheel-speed difference on the basis of a wheel speed of each drive wheel and a wheel speed of each of driven wheels;
   slip-rate derivation means for deriving a slip rate of said drive wheel based on said wheel-speed difference;
   engine-load detection means for detecting an engine load;
   acceleration-slip state determination means for determining that the vehicle is conditioned in an acceleration-slip state by comparing the derived slip rate with a predetermined threshold, to produce an acceleration-slip state indicative signal;
   control allocation determination means responsive to said acceleration-slip state indicative signal, for determining a control allocation between said primary and secondary traction control systems on the basis of said detected engine load, so that the control allocation of said primary traction control system to said secondary traction control system is set to 1:0 in a given low engine-load region to permit only a primary traction control executed by said primary traction control system, to 0:1 in a given high engine-load region to permit only a secondary traction control executed by said secondary traction control system, and to an engine-load dependent ratio in a transient engine-load region defined among said given low and high engine-load regions, said engine-load dependent ratio being defined so that the control allocation of said primary traction control system to said secondary traction control system is decreased in accordance with an increase in the detected engine load; and
   means for executing a traction control by operating said primary and secondary traction control systems on the basis of said determined control allocation.

4. The total traction control system as set forth in claim 3, wherein said secondary traction control system comprises at least one of a differential limiting torque controlling means, a wheel brake force controlling means, a throttle opening angle controlling means, and a transmission gear-ratio controlling means.

5. The total traction control system as set forth in claim 4, wherein said engine load detection means determines said engine load on the basis of either one of an engine revolution speed, a negative pressure of intake air introduced into the engine, and a flow rate of the intake air, or on the basis of an engine revolution speed and a reference injection amount of a fuel injector of the engine.

6. A total traction control system for an automotive vehicle, comprising:
   a primary traction control system for decreasingly adjusting an engine power of the vehicle by utilizing at least one of a fuel-cut control and an ignition-timing control;
   a secondary traction control system for decreasingly adjusting a driving force transmitted to left and right drive-wheels, by utilizing a driving-force reduction control different from said fuel-cut control and said ignition-timing control;
   wheel-speed difference derivation means for deriving a wheel-speed difference on the basis of a mean wheel speed of the left and right drive wheels and a mean wheel speed of left and right driven wheels;
   slip-rate derivation means for deriving a slip rate of said drive wheel based on said wheel-speed difference;

engine-load detection means for detecting an engine load;

acceleration-slip state determination means for determining that the vehicle is conditioned in an acceleration-slip state by comparing the derived slip rate with a predetermined threshold, to produce an acceleration-slip state indicative signal;

control allocation determination means responsive to said acceleration-slip state indicative signal, for determining a control allocation between said primary and secondary traction control systems on the basis of said detected engine load, so that the control allocation of said primary traction control system to said secondary traction control system is set to 1:0 in a given low engine-load region to permit only a primary traction control executed by said primary traction control system, to 0:1 in a given high engine-load region to permit only a secondary traction control executed by said secondary traction control system, and to a time dependent ratio in a transient engine-load region defined among said given low and high engine-load regions, said time dependent ratio being defined so that the control allocation of said primary traction control system to said secondary traction control system is decreased in accordance with an elapsed time from a particular time point when shifting from said low engine-load region to said transient engine-load region; and means for executing a traction control by operating said primary and secondary traction control systems on the basis of said determined control allocation.

7. The total traction control system as set forth in claim 6, wherein said time dependent ratio is held at 1:0 for a predetermined retardation time from said particular time point, to maintain only the primary traction control.

8. A total traction control system for an automotive vehicle, comprising:

a primary traction control system for decreasingly adjusting an engine power of the vehicle by utilizing a fuel-cut control and an ignition-timing control;

a secondary traction control system for decreasingly adjusting a driving force transmitted to left and right drive-wheels, by utilizing a driving-force reduction control different from said fuel-cut control and said ignition-timing control;

acceleration-slip state determination means for deriving a slip rate of each drive wheel and for determining that the vehicle is conditioned in an acceleration-slip state by comparing the derived slip rate with a predetermined threshold, to produce an acceleration-slip state indicative signal;

engine-load detection means for detecting an engine load;

control allocation determination means responsive to said acceleration-slip state indicative signal, for determining a control allocation between said primary and secondary traction control systems on the basis of said detected engine load, in a manner which decreases the control allocation of said primary traction control system to said secondary traction control system in accordance with an increase in the detected engine load;

means for executing a traction control by operating said primary and secondary traction control systems on the basis of said determined control allocation; and vaporization cooling means for executing a fuel-increment control for vaporization cooling in engine cylinders and a catalytic converter arranged in an exhaust system; said vaporization cooling means responsive to a vaporization cooling requirement to execute said fuel-increment control to the engine cylinders except at least one specified engine cylinder subjected to the fuel-cut control which is executed by said primary traction control system in accordance with a driving-torque reduction rate based on the control allocation.

* * * * *